(12) United States Patent
Cho et al.

(10) Patent No.: US 9,863,506 B2
(45) Date of Patent: Jan. 9, 2018

(54) PLANETARY GEAR TRAIN OF AUTOMATIC TRANSMISSION FOR VEHICLES

(71) Applicant: Hyundai Motor Company, Seoul (KR)

(72) Inventors: Wonmin Cho, Gyeonggi-do (KR); Seong Wook Hwang, Gyeonggi-do (KR); Hyun Sik Kwon, Seoul (KR); Jae Chang Kook, Gyeonggi-do (KR); Seongwook Ji, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 15/257,296

(22) Filed: Sep. 6, 2016

(65) Prior Publication Data

US 2017/0268611 A1    Sep. 21, 2017

(30) Foreign Application Priority Data

Mar. 16, 2016    (KR) .................. 10-2016-0031673

(51) Int. Cl.
*F16H 3/66*    (2006.01)

(52) U.S. Cl.
CPC ....... *F16H 3/66* (2013.01); *F16H 2200/0069* (2013.01); *F16H 2200/2012* (2013.01); *F16H 2200/2046* (2013.01)

(58) Field of Classification Search
None
See application file for complete search history.

(56) References Cited

U.S. PATENT DOCUMENTS

| | | | | |
|---|---|---|---|---|
| 8,678,972 | B2 * | 3/2014 | Wittkopp | F16H 3/66 |
| | | | | 475/275 |
| 8,888,648 | B2 | 11/2014 | Mellet et al. | |
| 8,926,469 | B2 * | 1/2015 | Hart | F16H 3/66 |
| | | | | 475/276 |
| 9,464,694 | B2 * | 10/2016 | Cho | F16H 3/66 |
| 9,488,249 | B2 * | 11/2016 | Ji | F16H 3/66 |

* cited by examiner

*Primary Examiner* — Dirk Wright
(74) *Attorney, Agent, or Firm* — Mintz Levin Cohn Ferris Glovsky and Popeo, P.C.; Peter F. Corless

(57) ABSTRACT

A planetary gear train of a transmission for a vehicle is provided. The planetary gear train includes an input shaft that receives power of an engine and an output shaft that outputs power. Additionally, four planetary gear sets are provided each having three rotation elements. Various shafts then connect the rotation elements either directly or selectively. Accordingly, a gear shift stage appropriate to a rotation speed of an engine is implemented and operating noise of a vehicle is reduced by using a driving point in a low rotation speed range of the engine.

8 Claims, 2 Drawing Sheets

FIG. 2

| Shift stage | Control element ||||||  Gear ratio |
|---|---|---|---|---|---|---|---|
| | C1 | C2 | C3 | C4 | B1 | B2 | |
| D1  | ● |   | ● |   |   | ● | 4.300 |
| D2  |   | ● | ● |   |   | ● | 3.014 |
| D3  |   | ● | ● |   |   | ● | 2.326 |
| D4  | ● | ● |   | ● |   | ● | 1.943 |
| D5  | ● | ● |   |   |   | ● | 1.536 |
| D6  | ● | ● |   | ● |   |   | 1.000 |
| D7  |   | ● |   | ● | ● |   | 0.838 |
| D8  |   | ● |   |   | ● |   | 0.714 |
| D9  |   |   | ● | ● | ● |   | 0.598 |
| D10 |   |   | ● | ● | ● |   | 0.390 |
| REV | ● |   |   | ● |   | ● | 2.129 |

PLANETARY GEAR TRAIN OF AUTOMATIC TRANSMISSION FOR VEHICLES

CROSS-REFERENCE TO RELATED APPLICATION

This application claims priority to and the benefit of Korean Patent Application No. 10-2016-0031673 filed in the Korean Intellectual Property Office on Mar. 16, 2016, the entire contents of which are incorporated herein by reference.

BACKGROUND (a) Field of the Invention

The present invention relates to an automatic transmission for a vehicle, and more particularly, to a planetary gear train of an automatic transmission for a vehicle that improves a power delivery performance and enhances fuel consumption by implementing at least forward ten-speed with a minimal configuration and that reduces running noise of the vehicle by using a driving point in a low rotation speed range of an engine.

(b) Description of the Related Art

In general, in an automatic transmission field, research has been conducted regarding a multistage of a gear shift stage to enhance fuel consumption of a vehicle and to maximize drivability thereof, and recently, increase of an oil price is triggering a competition in enhancing fuel consumption of the vehicle. Accordingly, research regarding the reduction of a weight of an engine and that enhances fuel consumption thereof has been conducted for downsizing the engine, and in the automatic transmission, a research on technology that can simultaneously secure drivability and fuel consumption competitive power through a multistage of a gear shift stage has been conducted.

However, in the automatic transmission, as a gear shift stage increases, the internal component number, particularly, the planetary gear set number increases and thus a full length of the transmission increases and a mounting ability, a production cost, a weight, and power delivery efficiency may thus be worsened. Therefore, in the automatic transmission, to increase a fuel consumption enhancement effect through a multistage of a gear shift stage, development of a planetary gear train that can induce maximum efficiency with minimal number of components is important.

Accordingly, an automatic transmission is formed to implement a shift of 8-speed or more to be mounted within a vehicle, and research and development of a planetary gear train capable of implementing a gear shift stage of 8-speed or more has been continuously required. However, a general 8-speed or more of automatic transmission is often formed with three or four planetary gear sets and five or six control elements (friction element), and thus, a full length of the system increases and thus there is a drawback in that a mounting ability is worsened. Accordingly, to form a gear shift stage of an automatic transmission in a multistage, a double row structure that disposes a planetary gear set on a planetary gear set has been adapted or a dog clutch has been applied instead of a wet control element. However, such a structure is limited and a shift feel is worsened due to application of the dog clutch.

The above information disclosed in this section is merely for enhancement of understanding of the background of the invention and therefore it may contain information that does not form the prior art that is already known in this country to a person of ordinary skill in the art.

SUMMARY

The present invention provides a planetary gear train of an automatic transmission for a vehicle having advantages of being capable of obtaining power delivery performance improvement and fuel consumption enhancement effects according to a multistage of a gear shift stage by implementing a gear shift stage of at least forward ten-speed or more and at least reverse one-speed or more with a minimal configuration and reducing running noise of the vehicle by using a driving point in a low rotation speed range of an engine.

An exemplary embodiment of the present invention provides a planetary gear train of an automatic transmission for a vehicle that may include: an input shaft configured to receive power of an engine; an output shaft configured to output power; a first planetary gear set having first, second, and third rotation elements; a second planetary gear set having fourth, fifth, and sixth rotation elements; a third planetary gear set having seventh, eighth, and ninth rotation elements; a fourth planetary gear set having tenth, eleventh, and twelfth rotation elements; a first shaft that connects the first rotation element and the fourth rotation element; a second shaft that connects the second rotation element and the eleventh rotation element and that may be directly connected with the output shaft; a third shaft that connects the third rotation element and the twelfth rotation element; a fourth shaft that may be connected with the fifth rotation element and that may be directly connected with the input shaft; a fifth shaft that may be connected with the sixth rotation element; a sixth shaft that connects the seventh rotation element and the tenth rotation element; a seventh shaft that may be connected with the eighth rotation element and that may be selectively connected with the fourth shaft and the fifth shaft; and an eighth shaft that may be connected with the ninth rotation element and that may be selectively connected with the second shaft and the fifth shaft. The first shaft and the third shaft each may be selectively connected with a transmission housing.

The first, second, and third rotation elements of the first planetary gear set may be a first sun gear, a first planetary carrier, and a first ring gear, respectively, the fourth, fifth, and sixth rotation elements of the second planetary gear set may be a second sun gear, a second planetary carrier, and a second ring gear, respectively, the seventh, eighth, and ninth rotation elements of the third planetary gear set may be a third sun gear, a third planetary carrier, and a third ring gear, respectively, and the tenth, eleventh, and twelfth rotation elements of the fourth planetary gear set may be a fourth sun gear, a fourth planetary carrier, and a fourth ring gear, respectively.

The planetary gear train may further include: a first clutch that may selectively connect the fourth shaft and the seventh shaft; a second clutch that may selectively connect the second shaft and the eighth shaft; a third clutch that may selectively connect the fifth shaft and the seventh shaft; a fourth clutch that may selectively connect the fifth shaft and the eighth shaft; a first brake that may selectively connect the first shaft and the transmission housing; and a second brake that may selectively connect the third shaft and the transmission housing. According to the present invention, by combining four planetary gear sets formed with a simplified planetary gear set with six control elements, a gear shift stage of at least forward ten-speed or more and a gear shift stage of at least reverse one-speed or more may be implemented.

Further, according to the present invention, by forming a gear shift stage of an automatic transmission in a multistage, a gear shift stage appropriate to a rotation speed of an engine may be implemented, and particularly, running noise of a vehicle may be reduced by using a driving point in a low rotation speed range of the engine. Further, according to the present invention, engine driving efficiency may be maximized with a high efficiency multistage, and a power delivery performance and fuel consumption may be improved. In addition, an effect that may be obtained or estimated due to an exemplary embodiment of the present invention is directly or implicitly described in a detailed description of an exemplary embodiment of the present invention. That is, various effects that are estimated according to an exemplary embodiment of the present invention will be described within a detailed description to be described later.

BRIEF DESCRIPTION OF THE DRAWINGS

The above and other objects, features and other advantages of the present invention will be more clearly understood from the following detailed description when taken in conjunction with the accompanying drawings, in which:

FIG. 2 is a table illustrating operation based on a gear shift stage of a control element applied to a planetary gear train according to an exemplary embodiment of the present invention.

DETAILED DESCRIPTION

Figure 1:
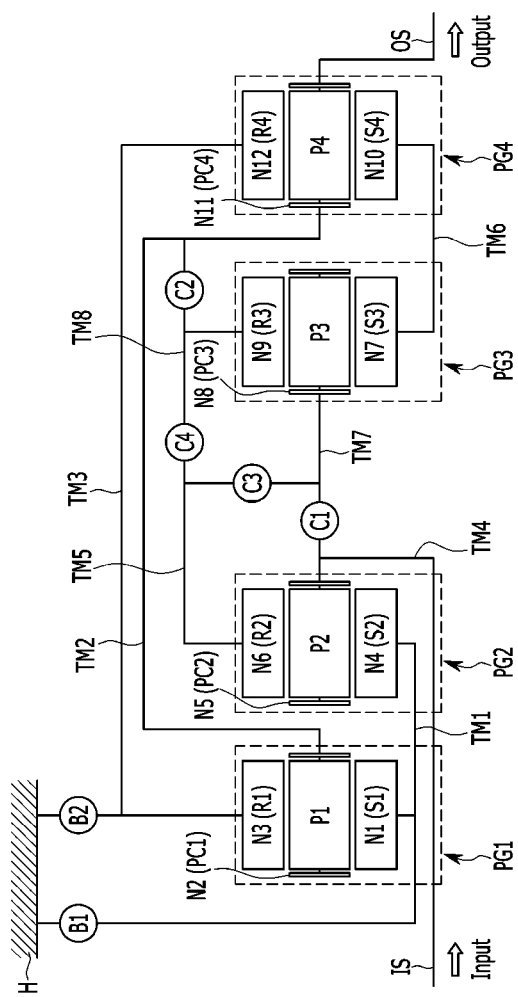
FIG. 1 is a schematic diagram illustrating a planetary gear train according to an exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, an exemplary embodiment of the present invention will be described in detail with reference to the accompanying drawings.

FIG. 1 is a schematic diagram illustrating a planetary gear train according to an exemplary embodiment of the present invention. Referring to FIG. 1, a planetary gear train according to an exemplary embodiment of the present invention may include first, second, third, and fourth planetary gear sets PG1, PG2, PG3, and PG4 disposed on the same shaft line, an input shaft IS, an output shaft OS, eight shafts TM1-TM8 that connect each rotation element of the first, second, third, and fourth planetary gear sets PG1, PG2, PG3, and PG4, four clutches C1-C4 and two brakes B1-B2, which are control elements, and a transmission housing H.

Rotation power from an engine input from the input shaft IS may be shifted by a mutual compensation operation of the first, second, third, and fourth planetary gear sets PG1, PG2, PG3, and PG4 to be output through the output shaft OS. Particularly, the planetary gear sets may be disposed in order of the first, second, third, and fourth planetary gear sets PG1, PG2, PG3, and PG4 from the engine side. The input shaft IS may be an input member, and a torque of rotation power from a crankshaft of the engine may be converted and input using a torque converter. The output shaft OS may be an output member and may be disposed on the same shaft line as that of the input shaft IS to deliver a shifted driving torque to a drive shaft through a differential apparatus.

The first planetary gear set PG1 may be a single pinion planetary gear set and may include a first sun gear S1, which is a first rotation element N1, a first planetary carrier PC1, which is a second rotation element N2 configured to support a rotation of a first pinion gear P1 externally engaged with the first sun gear S1, which is the first rotation element N1, and a first ring gear R1, which is a third rotation element N3 internally engaged with the first pinion gear P1. The second planetary gear set PG2 may be a single pinion planetary gear set and may include a second sun gear S2, which is a fourth rotation element N4, a second planetary carrier PC2, which is a fifth rotation element N5 configured to support a rotation of a second pinion gear P2 externally engaged with the second sun gear S2, which is the fourth rotation element N4, and a second ring gear R2, which is a sixth rotation element N6 internally engaged with the second pinion gear P2.

The third planetary gear set PG3 may be a single pinion planetary gear set and may include a third sun gear S3, which is a seventh rotation element N7, a third planetary carrier PC3, which is an eighth rotation element N8 configured to support a rotation of a third pinion gear P3 externally engaged with the third sun gear S3, which is the seventh rotation element N7, and a third ring gear R3, which is a ninth rotation element N9 internally engaged with the third pinion gear P3. The fourth planetary gear set PG4 may be a single pinion planetary gear set and may include a fourth sun gear S4, which is a tenth rotation element N10, a fourth planetary carrier PC4, which is an eleventh rotation element N11 configured to support a rotation of a fourth pinion gear P4 externally engaged with the fourth sun gear S4, which is the tenth rotation element N10, and a fourth ring gear R4, which is a twelfth rotation element N12 internally engaged with the fourth pinion gear P4.

Particularly, in the first, second, third, and fourth planetary gear sets PG1, PG2, PG3, and PG4, the first rotation element N1 may be directly connected with the fourth rotation element N4, the second rotation element N2 may be directly connected with the eleventh rotation element N11, the third rotation element N3 may be directly connected with the twelfth rotation element N12, and the seventh rotation element N7 may be directly connected with the tenth rotation element N10 and thus the first, second, third, and fourth planetary gear sets PG1, PG2, PG3, and PG4 may operate while holding total eight shafts TM1-TM8. A configuration of the eight shafts TM1-TM8 is described in detail as follows.

The eight shafts TM1-TM8 may be a rotation member configured to deliver power while rotating together with a rotation element connected to directly connect or to selectively connect a plurality of rotation elements among rotation elements of the planetary gear sets PG1, PG2, PG3, and PG4 and may be a fixing member that directly connects and fixes the rotation element to the transmission housing H.

The first shaft TM1 may connect the first rotation element {N1; first sun gear S1} and the fourth rotation element {N4; second sun gear S2} and may operate as a selective input element while being selectively connected with the transmission housing H. The second shaft TM2 may connect the second rotation element {N2; first planetary carrier PC1} and the eleventh rotation element {N11; fourth planetary carrier PC4} and may be directly connected with the output shaft OS to operate as an output element. The third shaft TM3 may connect the third rotation element {N3; first ring gear R1} and the twelfth rotation element {N12; fourth ring gear R4} and may operate as a selective input element while being selectively connected with the transmission housing H. The fourth shaft TM4 may be connected with the fifth rotation element {N5; second planetary carrier PC2} and may be directly connected with the input shaft IS to operate as an input element.

The fifth shaft TM5 may be connected with the sixth rotation element {N6; second ring gear R2}. The sixth shaft TM6 may connect the seventh rotation element {N7; third sun gear S3} and the tenth rotation element {N10; fourth sun gear S4}. The seventh shaft TM7 may be connected with the eighth rotation element {N8; third planetary carrier PC3} and may be selectively connected with the fourth shaft TM4 and the fifth shaft TM5. The eighth shaft TM8 may be connected with the ninth rotation element {N9; third ring gear R3} and may be selectively connected with the second shaft TM2 and the fifth shaft TM5.

Among the eight shafts TM1-TM8, in a portion including the input shaft IS and the output shaft OS and that mutually selectively connects shafts, four clutches C1, C2, C3, and C4 may be disposed. Further, among the eight shafts TM1-TM8, in a portion in which the shaft and the transmission housing H are selectively connected, two brakes B1 and B2 may be disposed. A disposition location of the four clutches C1-C4 and two brakes B1-B2 is described as follows.

The first clutch C1 may be disposed between the fourth shaft TM4 and the seventh shaft TM7 to selectively connect the fourth shaft TM4 directly connected with the input shaft IS and the seventh shaft TM7 to deliver power. The second clutch C2 may be disposed between the second shaft TM2 and the eighth shaft TM8 to selectively connect the second shaft TM2 and the eighth shaft TM8 to deliver power. The third clutch C3 may be disposed between the fifth shaft TM5 and the seventh shaft TM7 to selectively connect the fifth shaft TM5 and the seventh shaft TM7 to deliver power.

The fourth clutch C4 may be disposed between the fifth shaft TM5 and the eighth shaft TM8 to selectively connect the fifth shaft TM5 and the eighth shaft TM8 to deliver power. The first brake B1 may be disposed between the first shaft TM1 and the transmission housing H to selectively connect and fix the first shaft TM1 to the transmission housing H. The second brake B2 may be disposed between the third shaft TM3 and the transmission housing H to selectively connect and fix the third shaft TM3 to the transmission housing H. In the foregoing description, each control element formed with the first, second, third, and fourth clutches C1, C2, C3, and C4 and the first and second brakes B1 and B2 may be formed with a multi-plate type hydraulic pressure friction coupling unit friction coupled by a hydraulic pressure.

FIG. 2 is a table illustrating operation based on each gear shift stage of a control element applied to a planetary gear train according to an exemplary embodiment of the present invention. Referring to FIG. 2, in each gear shift stage of the planetary gear train according to an exemplary embodiment of the present invention, among the first, second, third, and fourth clutches C1, C2, C3, and C4 and the first and second brakes B1 and B2, which are control elements, while three elements operate, a shift of reverse one-speed and forward ten-speed may be performed, and a shift process is described as follows.

In a forward one-speed gear shift stage D1, the first and third clutches C1 and C3 and the second brake B2 may be configured to operate simultaneously with a gear ratio of about 4.3. Accordingly, when the fourth shaft TM4 is connected with the seventh shaft TM7 by operation of the first clutch C1 and in which the fifth shaft TM5 is connected with the seventh shaft TM7 by operation of the third clutch C3, rotation power of the input shaft IS may be input to the fourth shaft TM4. The third shaft TM3 may be shifted to a forward one-speed by a mutual compensation operation of each shaft while operating as a fixing element by operation of the second brake B2 to output power through the output shaft OS connected with the second shaft TM2.

In a forward two-speed gear shift stage D2, the third and fourth clutches C3 and C4 and the second brake B2 may be configured to operate simultaneously with a gear ratio of about 3.014. Accordingly, when the fifth shaft TM5 is connected with the seventh shaft TM7 and the eighth shaft TM8 by operation of the third clutch C3 and the fourth clutch C4, rotation power of the input shaft IS may be input to the fourth shaft TM4. The third shaft TM3 may be shifted to a forward second-speed by a mutual compensation operation of each shaft while operating as a fixing element by operation of the second brake B2 to output power through the output shaft OS connected with the second shaft TM2.

In a forward three-speed gear shift stage D3, the second and third clutches C2 and C3 and the second brake B2 may be configured to operate simultaneously with a gear ratio of about 2.326. Accordingly, when the second shaft TM2 is connected with the eighth shaft TM8 by operation of the second clutch C2 and in which the fifth shaft TM5 is connected with the seventh shaft TM7 by operation of the third clutch C3, rotation power of the input shaft IS may be input to the fourth shaft TM4. The third shaft TM3 may be shifted to a forward three-speed by a mutual compensation operation of each shaft while operating as a fixing element by operation of the second brake B2 to output power through the output shaft OS connected with the second shaft TM2.

In a forward four-speed gear shift stage D4, the second and fourth clutches C2 and C4 and the second brake B2 may be configured to operate simultaneously with a gear ratio of about 1.943. Accordingly, when the second shaft TM2 is connected with the eighth shaft TM8 by operation of the second clutch C2 and in which the fifth shaft TM5 is connected with the eighth shaft TM8 by operation of the fourth clutch C4, rotation power of the input shaft IS may be input to the fourth shaft TM4. The third shaft TM3 may be shifted to a forward four-speed by a mutual compensation operation of each shaft while operating as a fixing element by operation of the second brake B2 to output power through the output shaft OS connected with the second shaft TM2.

In a forward five-speed gear shift stage D5, the first and second clutches C1 and C2 and the second brake B2 may be configured to operate simultaneously with a gear ratio of about 1.536. Accordingly, when the fourth shaft TM4 is connected with the seventh shaft TM7 by operation of the first clutch C1 and in which the second shaft TM2 is connected with the eighth shaft TM8 by operation of the second clutch C2, rotation power of the input shaft IS may be input to the fourth shaft TM4. The third shaft TM3 may be shifted to a forward five-speed by a mutual compensation operation of each shaft while operating as a fixing element by operation of the second brake B2 to output power through the output shaft OS connected with the second shaft TM2.

In a forward six-speed gear shift stage D6, the first, second, and fourth clutches C1, C2, and C4 may be configured to operate simultaneously with a gear ratio of about 1. Accordingly, when the fourth shaft TM4 is connected with the seventh shaft TM7 by operation of the first clutch C1 and in which the second shaft TM2 is connected with the eighth shaft TM8 by operation of the second clutch C2 and in which the fifth shaft TM5 is connected with the eighth shaft TM8 by operation of the fourth clutch C4, rotation power of the input shaft IS may be input to the fourth shaft TM4. Accordingly, while the entire planetary gear sets PG1, PG2, PG3, and PG4 integrally rotate, the entire planetary gear sets PG1, PG2, PG3, and PG4 may be shifted to a forward six-speed that outputs the same value as an input value to output power through the output shaft OS connected with the second shaft TM2.

In a forward seven-speed gear shift stage D7, the first and second clutches C1 and C2 and the first brake B1 may be configured to operate simultaneously with a gear ratio of about 0.838. Accordingly, when the fourth shaft TM4 is connected with the seventh shaft TM7 by operation of the first clutch C1 and in which the second shaft TM2 is connected with the eighth shaft TM8 by operation of the second clutch C2, rotation power of the input shaft IS may be input to the fourth shaft TM4. The first shaft TM1 may be shifted to a forward seven-speed by a mutual compensation operation of each shaft while operating as a fixing element by operation of the first brake B1 to output power through the output shaft OS connected with the second shaft TM2.

In a forward eight-speed gear shift stage D8, the second and fourth clutches C2 and C4 and the first brake B1 may be configured to operate simultaneously with a gear ratio of about 0.714. Accordingly, when the second shaft TM2 is connected with the eighth shaft TM8 by operation of the second clutch C2 and in which the fifth shaft TM5 is connected with the eighth shaft TM8 by operation of the fourth clutch C4, rotation power of the input shaft IS may be input to the fourth shaft TM4. The first shaft TM1 may be shifted to a forward eight-speed by a mutual compensation operation of each shaft while operating as a fixing element by operation of the first brake B1 to output power through the output shaft OS connected with the second shaft TM2.

In a forward nine-speed gear shift stage D9, the second and third clutches C2 and C3 and the first brake B1 may be configured to operate simultaneously with a gear ratio of about 0.598. Accordingly, when the second shaft TM2 is connected with the eighth shaft TM8 by operation of the second clutch C2 and in which the fifth shaft TM5 is connected with the seventh shaft TM7 by operation of the third clutch C3, rotation power of the input shaft IS may be input to the fourth shaft TM4. The first shaft TM1 may be shifted to a forward nine-speed by a mutual compensation operation of each shaft while operating as a fixing element by operation of the first brake B1 to output power through the output shaft OS connected with the second shaft TM2.

In a forward ten-speed gear shift stage D10, the third and fourth clutches C3 and C4 and the first brake B1 may be configured to operate simultaneously with a gear ratio of about 0.390. Accordingly, when the fifth shaft TM5 is connected with the seventh shaft TM7 and the eighth shaft TM8 by operation of the third clutch C3 and the fourth clutch C4, rotation power of the input shaft IS may be input to the fourth shaft TM4. The first shaft TM1 may be shifted to a forward ten-speed by a mutual compensation operation of each shaft while operating as a fixing element by operation of the first brake B1 to output power through the output shaft OS connected with the second shaft TM2.

In a reverse gear shift stage REV, the first and fourth clutches C1 and C4 and the second brake B2 may be simultaneously operated with a gear ratio of about 2.129. Accordingly, when the fourth shaft TM4 is connected with the seventh shaft TM7 by operation of the first clutch C1 and in which the fifth shaft TM5 is connected with the eighth shaft TM8 by operation of the fourth clutch C4, rotation power of the input shaft IS may be input to the fourth shaft TM4. The third shaft TM3 may be shifted to the reverse by a mutual compensation operation of each shaft while operating as a fixing element by operation of the second brake B2 to output power through the output shaft OS connected with the second shaft TM2.

As described above, a planetary gear train according to an exemplary embodiment of the present invention may enable four planetary gear sets PG1, PG2, PG3, and PG4 to realize a gear shift stage of at least forward ten-speed or more and at least reverse one-speed or more through an operation control of four clutches C1, C2, C3, and C4 and two brakes B1 and B2. Further, by forming a gear shift stage of an automatic transmission in a multistage, a planetary gear train according to an exemplary embodiment of the present invention may implement a gear shift stage appropriate to a rotation speed of an engine and particularly, may reduce operating noise of a vehicle by using a driving point in a low rotation speed range of the engine. Further, by forming an automatic transmission in a multistage, a planetary gear train according to an exemplary embodiment of the present invention may maximize engine driving efficiency and improve a power delivery performance and fuel consumption.

While this invention has been described in connection with what is presently considered to be practical embodiments, it is to be understood that the invention is not limited to the disclosed exemplary embodiments, but, on the contrary, is intended to cover various modifications and equivalent arrangements included within the spirit and scope of the appended claims.

What is claimed is:

1. A planetary gear train of an automatic transmission for a vehicle, comprising:
   an input shaft configured to receive power of an engine;
   an output shaft configured to output power;
   a first planetary gear set having first, second, and third rotation elements;
   a second planetary gear set having fourth, fifth, and sixth rotation elements;
   a third planetary gear set having seventh, eighth, and ninth rotation elements;
   a fourth planetary gear set having tenth, eleventh, and twelfth rotation elements;

a first shaft that connects the first rotation element and the fourth rotation element;

a second shaft that connects the second rotation element and the eleventh rotation element and that is directly connected with the output shaft;

a third shaft that connects the third rotation element and the twelfth rotation element;

a fourth shaft that is connected with the fifth rotation element and that is directly connected with the input shaft;

a fifth shaft that is connected with the sixth rotation element;

a sixth shaft that connects the seventh rotation element and the tenth rotation element;

a seventh shaft that is connected with the eighth rotation element and that is selectively connected with the fourth shaft and the fifth shaft; and an eighth shaft that is connected with the ninth rotation element and that is selectively connected with the second shaft and the fifth shaft.

2. The planetary gear train of claim 1, wherein the first shaft and the third shaft each are selectively connected with a transmission housing.

3. The planetary gear train of claim 1, wherein:
the first, second, and third rotation elements of the first planetary gear set are a first sun gear, a first planetary carrier, and a first ring gear, respectively,
the fourth, fifth, and sixth rotation elements of the second planetary gear set are a second sun gear, a second planetary carrier, and a second ring gear, respectively,
the seventh, eighth, and ninth rotation elements of the third planetary gear set are a third sun gear, a third planetary carrier, and a third ring gear, respectively, and
the tenth, eleventh, and twelfth rotation elements of the fourth planetary gear set are a fourth sun gear, a fourth planetary carrier, and a fourth ring gear, respectively.

4. The planetary gear train of claim 2, further comprising:
a first clutch that selectively connects the fourth shaft and the seventh shaft;
a second clutch that selectively connects the second shaft and the eighth shaft;
a third clutch that selectively connects the fifth shaft and the seventh shaft;
a fourth clutch that selectively connects the fifth shaft and the eighth shaft;
a first brake that selectively connects the first shaft and the transmission housing; and
a second brake that selectively connects the third shaft and the transmission housing.

5. A planetary gear train of an automatic transmission for a vehicle, comprising:
an input shaft configured to receive power of an engine;
an output shaft configured to output power;
a first planetary gear set having first, second, and third rotation elements;
a second planetary gear set having fourth, fifth, and sixth rotation elements;
a third planetary gear set having seventh, eighth, and ninth rotation elements; and
a fourth planetary gear set having tenth, eleventh, and twelfth rotation elements,
wherein the input shaft is directly connected with the fifth rotation element,
wherein the output shaft is directly connected with the eleventh rotation element,
wherein the first rotation element is directly connected with the fourth rotation element,
wherein the second rotation element is directly connected with the eleventh rotation element,
wherein the third rotation element is directly connected with the twelfth rotation element,
wherein the seventh rotation element is directly connected with the tenth rotation element,
wherein the eighth rotation element is selectively connected with the fifth rotation element and the sixth rotation element, and
wherein the ninth rotation element is selectively connected with the sixth rotation element and the eleventh rotation element.

6. The planetary gear train of claim 5, wherein the first rotation element and the third rotation element each are selectively connected with a transmission housing.

7. The planetary gear train of claim 5, wherein:
the first, second, and third rotation elements of the first planetary gear set are a first sun gear, a first planetary carrier, and a first ring gear, respectively,
the fourth, fifth, and sixth rotation elements of the second planetary gear set are a second sun gear, a second planetary carrier, and a second ring gear, respectively,
the seventh, eighth, and ninth rotation elements of the third planetary gear set are a third sun gear, a third planetary carrier, and a third ring gear, respectively, and
the tenth, eleventh, and twelfth rotation elements of the fourth planetary gear set are a fourth sun gear, a fourth planetary carrier, and a fourth ring gear, respectively.

8. The planetary gear train of claim 6, further comprising:
a first clutch that selectively connects the fifth rotation element and the eighth rotation element;
a second clutch that selectively connects the ninth rotation element and the eleventh rotation element;
a third clutch that selectively connects the sixth rotation element and the eighth rotation element;
a fourth clutch that selectively connects the sixth rotation element and the ninth rotation element;
a first brake that selectively connects the first rotation element and the transmission housing; and
a second brake that selectively connects the third rotation element and the transmission housing.

* * * * *